(12) United States Patent
Urano

(10) Patent No.: US 8,517,593 B2
(45) Date of Patent: Aug. 27, 2013

(54) WIRELESS POWER FEEDER, LIGHT SOURCE CARTRIDGE, AND WIRELESS ILLUMINATION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 292 days.

(21) Appl. No.: 13/179,229

(22) Filed: Jul. 8, 2011

(65) Prior Publication Data

US 2012/0007519 A1    Jan. 12, 2012

(30) Foreign Application Priority Data

Jul. 9, 2010    (JP) .................................. 2010-157011

(51) Int. Cl.
*H01R 33/00*    (2006.01)

(52) U.S. Cl.
USPC . 362/649; 362/372; 362/249.02; 362/311.02; 362/545; 315/277; 315/282

(58) Field of Classification Search
USPC ............... 362/640, 647, 649, 249.02, 311.02, 362/372, 362, 800, 545, 548, 549, 97.3; 315/70, 315/276–278, 282, 247, 312, 318; 333/219, 333/219.2; 307/104
See application file for complete search history.

(56) References Cited

U.S. PATENT DOCUMENTS

| | | | | |
|---|---|---|---|---|
| 7,825,543 B2 * | 11/2010 | Karalis et al. | ................. | 307/104 |
| 8,203,434 B2 * | 6/2012 | Yoshida | ..................... | 340/10.34 |
| 8,287,168 B2 * | 10/2012 | Taniuchi et al. | ............... | 362/545 |
| 8,337,049 B2 * | 12/2012 | Shida et al. | .................... | 362/294 |
| 8,390,250 B2 * | 3/2013 | Washiro | ......................... | 320/108 |
| 2008/0278264 A1 | 11/2008 | Karalis et al. | | |
| 2009/0015075 A1 | 1/2009 | Cook et al. | | |
| 2009/0072629 A1 | 3/2009 | Cook et al. | | |
| 2011/0049997 A1 * | 3/2011 | Urano | ........................... | 307/104 |
| 2011/0080053 A1 * | 4/2011 | Urano | ........................... | 307/104 |
| 2011/0080054 A1 * | 4/2011 | Urano | ........................... | 307/104 |
| 2011/0095619 A1 * | 4/2011 | Urano | ........................... | 307/104 |
| 2011/0101791 A1 * | 5/2011 | Urano | ........................... | 307/104 |
| 2011/0127846 A1 * | 6/2011 | Urano | ........................... | 307/104 |
| 2012/0043825 A1 * | 2/2012 | Urano | ........................... | 307/104 |

FOREIGN PATENT DOCUMENTS

| | | |
|---|---|---|
| JP | 2006-230032 | 8/2006 |
| JP | 2006-523363 | 10/2006 |
| JP | 2008-310963 | 12/2008 |
| JP | 3149146 | 3/2009 |
| WO | WO 2006/022365 A1 | 3/2006 |

* cited by examiner

*Primary Examiner* — Haiss Philogene
(74) *Attorney, Agent, or Firm* — McDermott Will & Emery LLP

(57) ABSTRACT

A feeding body 106 has a cylindrical part capable of housing a light source cartridge 104. A feeding coil L2 for supplying AC power to the light source cartridge 104 is buried in the bottom surface of the cylindrical part of the feeding body 106. A power transmission control circuit 108 supplies AC power to the feeding coil L2. The feeding body 106 can change the insertion depth of the light source cartridge 104 and has, in the inner wall, a screw groove for stabilizing the position of the light source cartridge.

11 Claims, 4 Drawing Sheets

WIRELESS POWER FEEDER, LIGHT SOURCE CARTRIDGE, AND WIRELESS ILLUMINATION SYSTEM

BACKGROUND OF THE INVENTION

1. Field of the Invention

The present invention relates to wireless AC power feeding and, more particularly, to power control thereof.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Pat. Appln. Publication No. 2009-0072629

[Patent Document 5] U.S. Pat. Appln. Publication No. 2009-0015075

[Patent Document 6] Japanese Utility Model registration No. 3,149,146

[Patent Document 7] Jpn. Pat. Appln. Laid-Open Publication No. 2008-310963

[Patent Document 8] Jpn. PCT National Publication No. 2006-523363

In the case of wireless power feeding, feeding power changes depending on the distance between a feeding coil and receiving coil. A table lamp disclosed in Patent Document 8 is categorized in the type (A), and the brightness of the lamp is controlled by the distance between a primary coil and a secondary coil. A spindle-shaped lamp assembly incorporating a light source and a secondary coil is suspended in the table lamp, and a primary housing including a primary coil is attached to the shaft of the table lamp. By moving up/down the primary housing, the distance between the primary coil and the secondary coil is changed to change the brightness of the lamp.

In the case of the table lamp disclosed in Patent Document 8, the lamp assembly has a special shape for this table lamp. Accordingly, an attachment method of the lamp assembly differs significantly from an attachment method of a typical light bulb. Further, a connecting part between the lamp assembly and table lamp, as well as, a connecting part between the primary housing and table lamp are weak points in terms of mechanical strength.

A main object of the present invention is to provide a technique for controlling the brightness of an illumination by wireless power feeding while continuing to employ an attachment method of a typical light bulb.

SUMMARY

A wireless power feeder according to the present invention includes: a feeding body having a cylindrical part capable of housing alight source cartridge and incorporating a feeding coil for supplying AC power to the light source cartridge; and a power transmission control circuit that supplies the AC power to the feeding coil. The feeding body is formed so as to be able to change the insertion depth of the light source cartridge into the cylindrical part and has a mechanism for fixing the light source cartridge. A screw groove may be formed in the inner wall of the cylindrical part of the feeding body so as to fix the light source cartridge.

With the above configuration, the light source cartridge can be attached to the feeding body with substantially the same use feeling as in the case of the attachment of a typical light bulb. Further, the light source cartridge is incorporated in the cylindrical part, so that the light source cartridge can be fixed stably inside the feeding body.

The wireless power feeder may include a plurality of feeding bodies. The power transmission control circuit may supply AC power to the plurality of feeding bodies. The plurality of feeding bodies may be connected in parallel to one another. In this case, the power transmission control circuit may supply the same AC voltage to the plurality of feeding bodies.

The power transmission control circuit includes: a bridge rectification circuit in which diodes are bridge-connected to one another; an AC power supply connected between the first and second connection points among four connection points of the bridge rectification circuit; a capacitor connected between third and fourth connection points of the four connection points and charged by the AC power supply; a switch inserted into a path of current discharged from the capacitor; and an oscillator that supplies AC current from the capacitor to the feeding coil by intermittently turning ON/OFF the switch. The oscillator may be controlled in terms of its oscillating frequency. The magnitude of the AC power may be changed depending on the oscillating frequency.

The feeding coil may be connected to a first capacitor in the inside of the feeding body. The resonance frequency between a receiving coil and a second capacitor which are included in the light source cartridge may coincide with the resonance frequency between the feeding coil and first capacitor. The power transmission control circuit may supply the AC power at the resonance frequency. The wireless power feeder may further include an indicator indicating the insertion depth of the light source cartridge into the feeding body.

A light source cartridge according to the present invention is formed so as to be inserted into a feeding body in the abovementioned wireless power feeder. The light source cartridge includes: a light source body; a receiving coil connected to the light source body; and a means for fixing the light source cartridge to the feeding body. The receiving coil is disposed at a position opposite to the feeding coil when the feeding body and the light source cartridge are attached to each other. The light source cartridge may further include an indicator indicating the insertion depth into the feeding body.

It is to be noted that any arbitrary combination of the above-described structural components and expressions changed between a method, an apparatus, a system, etc. are all effective as and encompassed by the present embodiment.

According to the present invention, it is possible to control the brightness of an illumination by wireless power feeding while continuing to employ an attachment method of a typical light bulb.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described with reference to the accompanying drawings.

Figure 1:
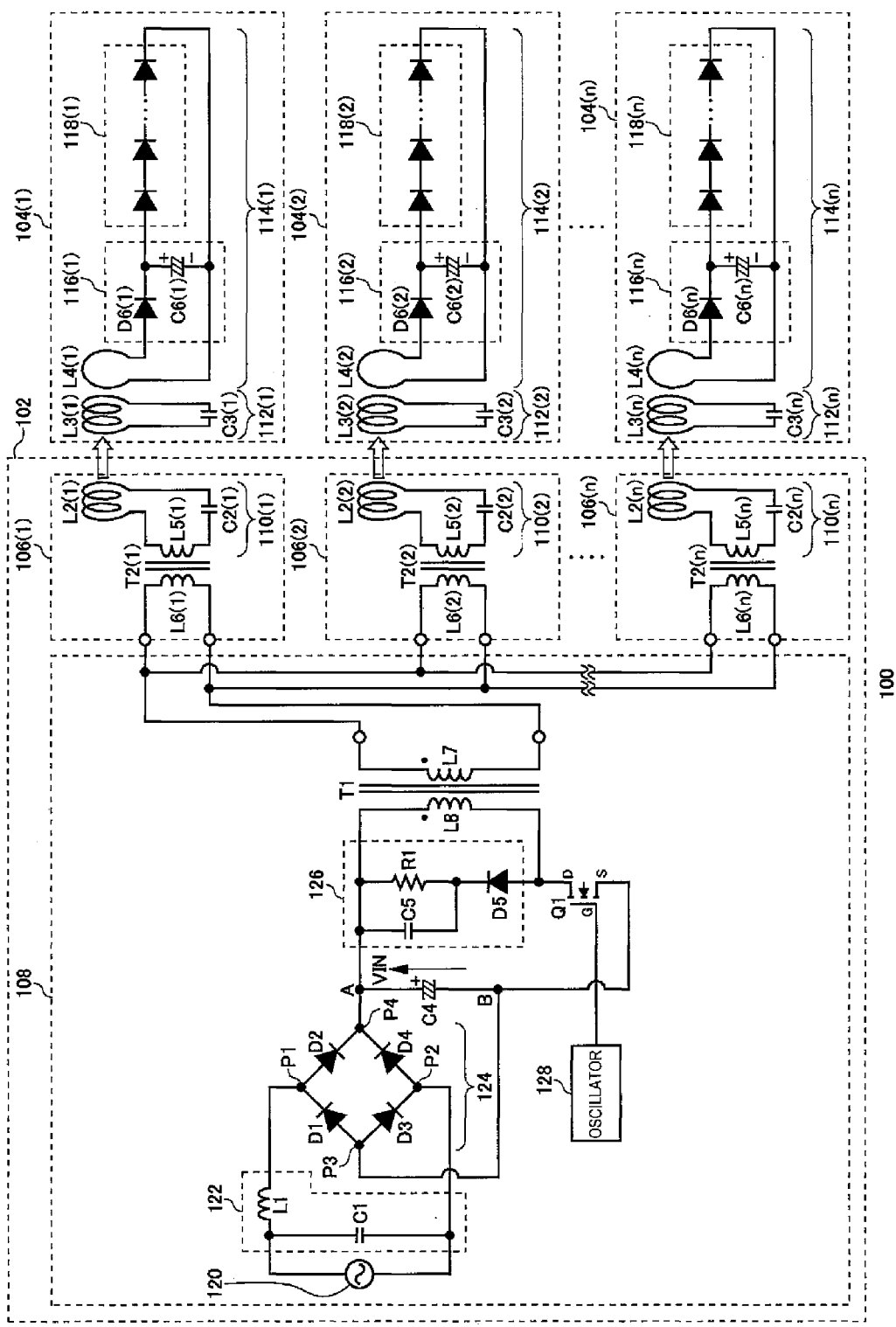
FIG. 1 is a system configuration view of a wireless illumination system.

FIG. 1 is a system configuration view of a wireless illumination system 100. The wireless illumination system 100 includes a wireless power feeder 102 and a plurality of light source cartridges 104 (104 (1) to 104 (n)). The light source cartridges each function as a "wireless power receiver". The wireless power feeder 102 includes, as basic components, a power transmission control circuit 108 and a plurality of feeding bodies 106 (106 (1) to 106 (n)). The number of the feeding bodies 106 is the same as the number of the light source cartridges 104.

A feeding coil L2 incorporated in the feeding body 106 faces a receiving coil L3 incorporated in the light source cartridge 104 with a distance of several mm between them. The wireless illumination system 100 feeds AC power from the feeding coil L2 to the receiving coil L3 by wireless. The wireless illumination system 100 according to the present embodiment is assumed to operate at a resonance frequency fr of 100 kHz or less. In the present embodiment, the resonance frequency fr is assumed to be 100 kHz. Note that the wireless illumination system 100 according to the present embodiment can operate in a high-frequency band such as ISM (Industry-Science-Medical) frequency band.

The feeding body 106 incorporates a feeding coil circuit 110 that includes the feeding coil L2, a capacitor C2, and an inductor L5. The inductor L5 of the feeding body 106 and an inductor L6 on the power transmission control circuit 108 side constitute a transformer T2. AC power is supplied from the power transmission control circuit 108 to the feeding body 106 through the transformer T2. The values of the feeding coil L2 and capacitor C2 are set such that the resonance frequency fr of the feeding coil circuit 110 is 100 kHz.

The light source cartridge 104 incorporates a receiving coil circuit 112 and a loading circuit 114. The receiving coil circuit 112 is a circuit in which the receiving coil L3 and a capacitor C3 are connected in series. The feeding coil L2 and receiving coil L3 face each other. The values of the receiving coil L3 and capacitor C3 are set such that the resonance frequency fr of the receiving coil circuit 112 is 100 kHz. The feeding coil L2 and receiving coil L3 need not have the same shape. When the feeding coil L2 generates a magnetic field at the resonance frequency fr, the feeding coil L2 and receiving coil L3 magnetically resonate, causing high current to flow in the receiving coil circuit 112.

The loading circuit 114 is a circuit in which a loading coil L4, a smoothing circuit 116, and an LED array 118 are connected. The receiving coil L3 and loading coil L4 face each other. The distance between the receiving coil L3 and loading coil L4 is comparatively small. Thus, the receiving coil L3 and loading coil L4 are electromagnetically strongly coupled to each other. The smoothing circuit 116 has a typical configuration including a capacitor C6 and a diode D6 and smoothes AC power of the loading coil L4. The smoothed current is supplied to the LED array 118 to cause the LED array 118 to emit light. To summarize, the AC power fed from the feeding coil L2 is received by the receiving coil L3 of the light source cartridge 104 and is then supplied to the LED array 118 through the loading coil L4.

When the LED array 118 is connected in series to the receiving coil circuit 112, the Q-value of the receiving coil circuit 112 is degraded. Therefore, the receiving coil circuit 112 for power reception and loading circuit 114 for power extraction are separated from each other. In order to enhance the power transmission efficiency, the center lines of the feeding coil L2, receiving coil L3, and loading coil L4 are preferably made to coincide with one another.

Next, a configuration of the power transmission control circuit 108 will be described. A capacitor C4 is connected between points A and B of FIG. 1. The capacitor C4 is charged by voltage of an AC power supply 120. The voltage (voltage between the points A and B) of the capacitor C4 is referred to as input voltage VIN.

The AC power supply 120 is a normal commercial power supply. The AC voltage of the AC power supply 120 is smoothed by a smoothing circuit 122 and is then rectified by a bridge rectification circuit 124 to be converted into DC voltage. The smoothing circuit 122 is a typical circuit including an inductor L1 and a capacitor C1. The bridge rectification circuit 124 is a circuit in which four diodes D1 to D4 are bridge-connected to one another. One end of the AC power supply 120 is connected to a connection point P1 between the diodes D1 and D2 through the smoothing circuit 122, and the other end thereof is connected to a connection point P2 between the diodes D3 and D4 through the smoothing circuit 122. A connection point P3 between the diodes D1 and D3 is connected to a negative-side point B of the capacitor C4, and a connection point P4 between the diodes D2 and D4 is connected to a positive-side point A of the capacitor C4.

Part of the current supplied from the AC power supply 120 flows in the connection point P1. The current flowing in the connection point P1 passes through the diode D2, connection point P4, point A, capacitor C4, point B, connection point P3, and diode D3 and returns to the connection point P2. Further, part of the current supplied from the AC power supply 120 flows in the connection point P2. The current flowing in the connection point P2 passes through the diode D4, connection point P4, point A, capacitor C4, point B, connection point P3, diode D1, and returns to the connection point P1. The direction of the current supplied from the AC power supply 120 switches at the frequency (e.g., 50 Hz) of the AC power supply 120. When the effective voltage of the AC power supply 120 is 100 (V), about 141 (V) which is the maximum voltage value is applied to the capacitor C4.

A series circuit of a switching transistor Q1 and a snubber circuit 126 is connected in parallel to the capacitor C4. The snubber circuit 126 is a typical circuit including a resistor R1, a capacitor C5, and a diode D5 and is inserted for suppressing the spike of a voltage waveform occurring when the switching transistor Q1 is turned off.

The drain (D) of the switching transistor Q1 is connected to the point A through the snubber circuit 126, and the source (S) thereof is connected to the point B. An oscillator 128 is connected to the gate (G) of the switching transistor Q1. The oscillating frequency of the oscillator 128 can be adjusted in a range of 20 to 100 kHz. When the switching transistor Q1 is turned on, current flows from the capacitor C4 to the snubber circuit 126 and the switching transistor Q1.

The inductor L8 connected in parallel to the snubber circuit 126 and an inductor L7 on the feeding body 106 side constitute a transformer T1. On/off operation of the switching transistor Q1 is repeated by the oscillator 128, so that AC current is supplied to the transformer T1. AC current flowing in the inductor L7 flows to the inductor L6, as well as, to the inductor L5 that constitutes, together with the inductor L6, the transformer T2. A plurality of inductors L6(1) to L6(n) is connected in parallel to the inductor L7. Thus, the same AC voltage is supplied to the feeding bodies 106 (1) to 106 (n).

To summarize, the capacitor C4 is charged by the AC power supply 120, and discharge timing from the capacitor C4 to the inductor L8 is controlled by the oscillator 128. The AC voltage of the inductor L8 is reduced by the two transformers T1 and T2, and the resultant AC power is supplied to the feeding coil circuit 110. Then, the AC power is supplied from the feeding coil circuit 110 to the light source cartridge 104, causing the LED array 118 to emit light. With the above configuration, AC power can be supplied at a given frequency from a typical commercial power supply to the light source cartridge 104. When the oscillating frequency is set equal to the resonance frequency of 100 kHz, the feeding coil L2 and receiving coil L3 magnetically resonate, with a result that power transmission efficiency of the feeding coil circuit 110 becomes maximum.

Figure 2:
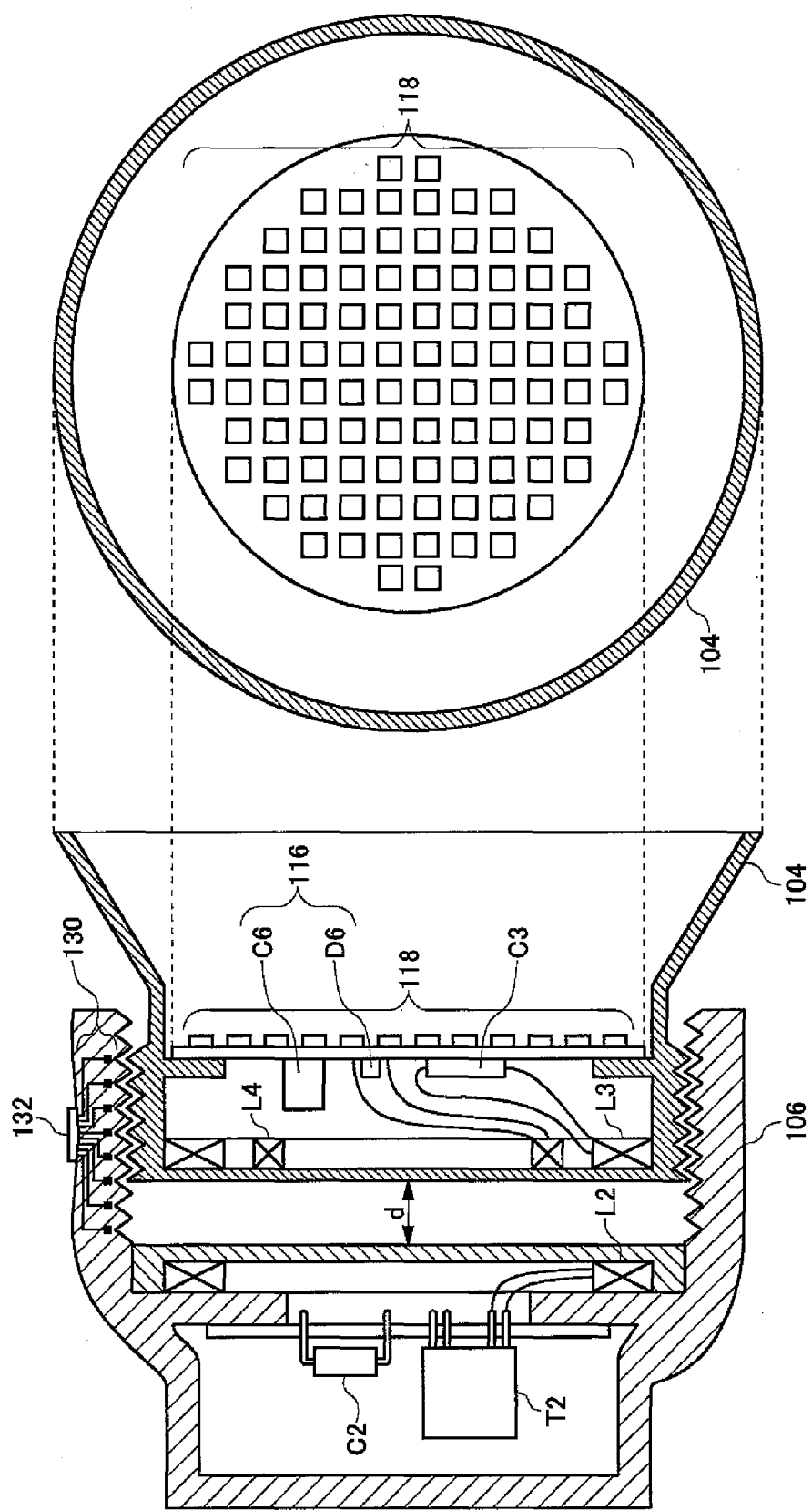
FIG. 2 is a side cross-sectional view and a front view illustrating a state where a light source cartridge has been attached to a feeding body.

FIG. 2 is a side cross-sectional view and a front view illustrating a state where the light source cartridge 104 has been attached to the feeding body 106. The receiving coil circuit 112 and loading circuit 114 are encapsulated in the light source cartridge 104. Similarly, the feeding coil circuit 110 is encapsulated in the feeding body 106. Thus, electrical contacts of the feeding body 106 and light source cartridge 104 are not exposed.

As illustrated in FIG. 2, the feeding body 106 has a cylindrical part capable of housing the light source cartridge 104. The feeding coil L2 is buried in the bottom surface of the cylindrical part. A screw groove is formed in the inner wall surface of the feeding body 106, and the light source cartridge 104 having an outer wall surface with a screw groove is inserted into the feeding body 106.

By rotating the light source cartridge 104, the insertion depth of the light source cartridge 104 can be adjusted. The light source cartridge 104 and feeding body 106 are fixed to each other by the screw grooves thereof.

When an inter-coil distance d is large, the impedance as viewed from the feeding body 106 is high, reducing feeding power. Accordingly, when the inter-coil distance d is set large, the illuminance of the LED array 118 is reduced to suppress power consumption.

By fitting the light source cartridge 104 in the cylindrical part of the feeding body 106 and rotating it, the light source cartridge 104 can be fixedly attached to the feeding body 106. That is, the attachment method of the light source cartridge 104 is substantially the same as that of a typical light bulb. Thus, it can be said that the attachment structure of the light source cartridge 104 is user-friendly. The light source cartridge 104 may be formed to have the same size as that of a typical light bulb. Owing to the screw structure, the insertion depth of the light source cartridge 104 is easily fine-adjusted, and further, the light source cartridge 104 is easily fixed in a stable position. Note that a mechanism for inserting/stabilizing the light source cartridge 104 with respect to the feeding body 106 is not limited to the screw structure. For example, an attachment mechanism such as a hook can be adopted to stabilize the position of the inserted light source cartridge 104. In short, it is only necessary to provide, to both or any of the light source cartridge 104 and the feeding body 106, a mechanism capable of freely changing the insertion depth of the light source cartridge 104 and capable of stably fixing the light source cartridge 104 at a changed insertion depth.

Although it is dangerous to attach a typical light bulb while current is flowing, the light source cartridge 104 of the present embodiment is of a non-contact power feeding type and thus can be attached safely even while current is flowing. Therefore, it is possible to attach the light bulb while confirming the actual brightness.

By adjusting the oscillating frequency, the brightness of the plurality of light source cartridges 104 can be adjusted collectively. Further, by adjusting the insertion depth for each light source cartridge 104, the brightness of the plurality of light source cartridges 104 can be fine-adjusted individually. That is, the wireless illumination system 100 has both functions of collectively adjusting the brightness of plurality of light source cartridges 104 and individually adjusting the brightness thereof, thus achieving a good balance between convenience and controllability.

The feeding body 106 has an indicator 132 indicating the insertion depth. A sensor array 130 is attached to the inner wall of the feeding body 106 so as to extend in the insertion direction. Each sensor of the sensor array 130 is a photoelectric sensor and is connected to the indicator 132. When the light source cartridge 104 is inserted near the sensor, the sensor generates a detection signal. The deeper the light source cartridge 104 is inserted, the more sensors generate the detection signal. The indicator 132 detects the insertion depth based on the number of the sensors that generate the detection signal and then indicates the insertion depth. The indicator 132 may include, e.g., a plurality of LEDs and indicate the insertion depth by the number of the lighted LEDs.

The indicator 132 and sensor array 130 may be provided on the light source cartridge 104 side, not the feeding body 132 side. Alternatively, the insertion depth may be indicated by a scale marked on the light source cartridge 104. In this case, the scale serves as the indicator. By providing the indicator, a user can estimate the brightness of the light source cartridge 104 even when current is not flowing.

Figure 3:
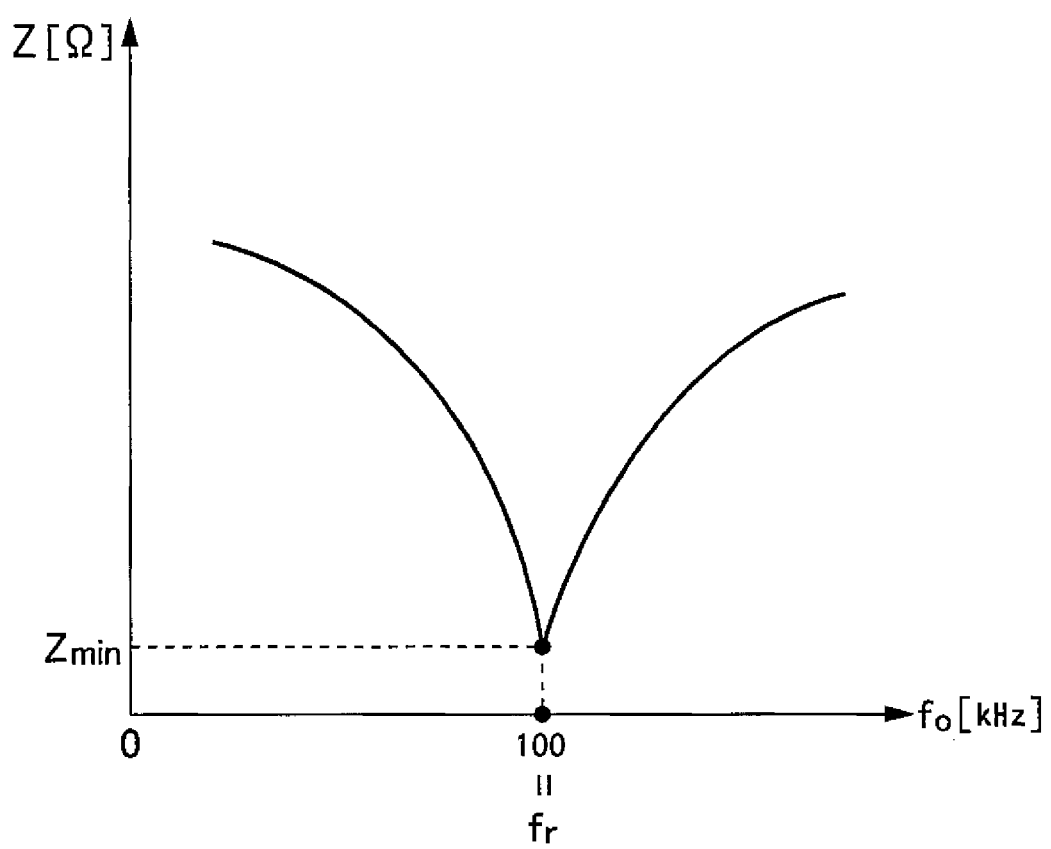
FIG. 3 is a graph illustrating the relationship between the impedance of a resonance circuit and a drive frequency.

FIG. 3 is a graph illustrating the relationship between an impedance Z of a resonance circuit and a drive frequency fo. The vertical axis represents the impedance Z of a resonance circuit part (series circuit of the capacitor C2 and feeding coil L2) in the feeding coil circuit 110. The horizontal axis represents the drive frequency fo. The drive frequency fo mentioned here is the frequency of AC power supplied from the feeding coil L2 to the receiving coil L3 and is defined by the oscillating frequency of the oscillator 128 in the present embodiment. The impedance Z of the resonance circuit becomes the minimum value Zmin at resonance state. Although it is ideal that the Zmin becomes zero at the resonance state, the Zmin does not generally become zero since the resonance circuit contains a slight resistive component.

In FIG. 3, the impedance Z becomes the minimum value when the drive frequency fo is 100 kHz, that is, when the drive frequency fo coincides with the resonance frequency fr, and the capacitor C2 and the feeding coil L2 are made to resonate with each other. When the drive frequency fo and resonance frequency fr deviate from each other, the capacitive reactance or inductive reactance in the impedance Z prevails, so that the impedance Z increases.

When the drive frequency fo coincides with the resonance frequency fr, AC current of the resonance frequency fr flows in the feeding coil L2, and AC current of the resonance frequency fr also flows in the receiving coil L3. The feeding coil L2 and capacitor C2 as well as the receiving coil L3 and capacitor C3 resonate at the same resonance frequency fr, so that the power transmission efficiency from the feeding coil L2 to the receiving coil L3 becomes maximum.

When the drive frequency fo and resonance frequency fr deviate from each other, AC current of a non-resonance frequency flows in the feeding coil L2. Thus, the feeding coil L2 and receiving coil L3 do not magnetically resonate, resulting in degradation of power transmission efficiency.

Thus, by adjusting the oscillating frequency of the oscillator 128 near the resonance frequency fr, the brightness of the plurality of light source cartridges 104 can be controlled collectively.

Figure 4:
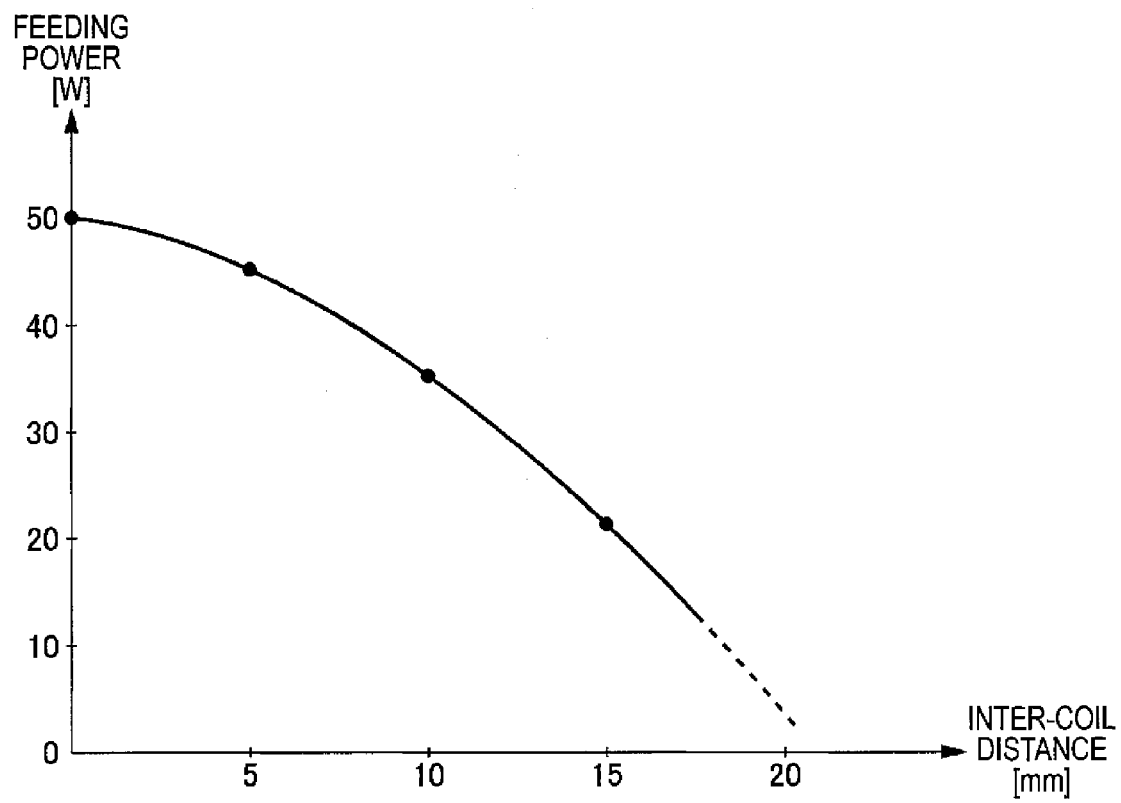
FIG. 4 is a graph illustrating the relationship between an inter-coil distance and feeding power.

FIG. 4 is a graph illustrating the relationship between an inter-coil distance and feeding power. The vertical axis represents power fed from the feeding coil L2, and the horizontal axis denotes an inter-coil distance. The larger the inter-coil distance d, the smaller the power fed from the feeding coil circuit 110 becomes.

The wireless illumination system 100 has been described based on the embodiment. In the wireless illumination system 100, by adjusting the insertion depth of the light source cartridge 104, the brightness of the plurality of light source cartridges 104 can be adjusted individually. There is an advantage that the light source cartridge 104 can be attached with the same use feeling as that at the attachment time of a typical light bulb.

The wireless feeder 102 can be used for AC commercial power supplies of various frequencies. AC current is once converted into a DC current, and feeding power can be generated by the oscillating frequency of the oscillator 128 at a given frequency. By adjusting the oscillating frequency of the oscillator 128, the brightness of the plurality of light source cartridges 104 can be controlled collectively.

Further, by providing the indicator 132, the insertion depth can be easily confirmed even when current is not flowing.

The present invention has been described based on the above embodiment. It should be understood by those skilled in the art that the above embodiment is merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

Although a description has been made in the present embodiment of the case where the LC resonance circuit is constituted by the feeding coil L2 and capacitor C2 in the feeding body 106, the capacitor C2 is not essential. Even if the capacitor C2 is not provided, wireless power feeding equivalent to that according to the present embodiment can be achieved as long as AC power can be fed to the feeding coil L2 at the resonance frequency fr.

What is claimed is:

1. A wireless power feeder comprising:
   a feeding body having a cylindrical part capable of housing a light source cartridge and incorporating a feeding coil for supplying AC power to the light source cartridge; and
   a power transmission control circuit that supplies the AC power to the feeding coil, wherein
   the feeding body is configured to be able to change the insertion depth of the light source cartridge and stabilize the position of the light source cartridge.

2. The wireless power feeder according to claim 1, wherein a screw groove is formed in the inner wall of the cylindrical part of the feeding body, and the light source cartridge is fixed by the screw groove.

3. The wireless power feeder according to claim 1, comprising a plurality of feeding bodies, wherein
   the power transmission control circuit supplies the AC power to the plurality of feeding bodies.

4. The wireless power feeder according to claim 3, wherein the plurality of feeding bodies are connected in parallel to one another, and
   the power transmission control circuit supplies the same AC voltage to the plurality of feeding bodies.

5. The wireless power feeder according to claim 1, wherein the power transmission control circuit includes:
   a bridge rectification circuit in which diodes are bridge-connected to one another;
   an AC power supply connected between the first and second connection points among four connection points of the bridge rectification circuit;
   a capacitor connected between the third and fourth connection points of the four connection points and charged by the AC power supply;
   a switch inserted into a path of current discharged from the capacitor; and
   an oscillator that supplies AC current from the capacitor to the feeding coil by intermittently turning ON/OFF the switch.

6. The wireless power feeder according to claim 5, wherein the oscillator can be controlled in terms of its oscillating frequency, and the magnitude of the AC power is changed depending on the oscillating frequency.

7. The wireless power feeder according to claim 1, wherein the feeding coil is connected to a first capacitor in the inside of the feeding body, the resonance frequency between a receiving coil and a second capacitor which are included in the light source cartridge coincides with the resonance frequency between the feeding coil and the first capacitor, and the power transmission control circuit supplies the AC power at the resonance frequency.

8. The wireless power feeder according to claim 1, further comprising an indicator indicating the insertion depth of the light source cartridge into the feeding body.

9. A light source cartridge formed so as to be inserted into a feeding body in the wireless power feeder as claimed in claim 1, comprising:

a light source body;

a receiving coil connected to the light source body; and means for fixing the light source cartridge to the feeding body, wherein the receiving coil is disposed at a position opposite to the feeding coil when the feeding body and the light source cartridge are attached to each other.

10. The light source cartridge according to claim 9, further comprising an indicator indicating the insertion depth into the feeding body.

11. A wireless illumination system comprising:

the wireless power feeder as claimed in claim 1; and the light source cartridge as claimed in claim 9 which is inserted into the feeding body of the wireless power feeder.

\* \* \* \* \*